(12) United States Patent
Park et al.

(10) Patent No.: US 7,028,551 B2
(45) Date of Patent: Apr. 18, 2006

(54) LINEARITY SEMI-CONDUCTIVE PRESSURE SENSOR

(75) Inventors: Kyong M. Park, Westlake Village, CA (US); Alexander F. Spivak, Thousand Oaks, CA (US)

(73) Assignee: Kavlico Corporation, Moorpart, CA (US)

( * ) Notice: Subject to any disclaimer, the term of this patent is extended or adjusted under 35 U.S.C. 154(b) by 92 days.

(21) Appl. No.: 10/872,055

(22) Filed: Jun. 18, 2004

(65) Prior Publication Data

US 2005/0279174 A1    Dec. 22, 2005

(51) Int. Cl.
*G01L 9/08*    (2006.01)

(52) U.S. Cl. .......................... 73/724; 73/718; 257/419

(58) Field of Classification Search .................. 73/724, 73/718
See application file for complete search history.

(56) References Cited

U.S. PATENT DOCUMENTS

| | | | |
|---|---|---|---|
| 4,398,426 A | 8/1983 | Park et al. | |
| 4,405,970 A | 9/1983 | Swindal et al. | |
| 4,415,948 A | 11/1983 | Grantham et al. | |
| 4,628,403 A | 12/1986 | Kuisma | |
| 4,951,174 A | 8/1990 | Grantham et al. | |
| 4,954,925 A | 9/1990 | Bullis et al. | |
| 4,998,179 A | 3/1991 | Grantham et al. | |
| 5,316,619 A * | 5/1994 | Mastrangelo | 73/715 |
| 5,369,544 A * | 11/1994 | Mastrangelo | 361/283.4 |
| 5,381,299 A | 1/1995 | Provenzano et al. | |
| 5,444,901 A | 8/1995 | Wiegand et al. | |
| 5,576,251 A | 11/1996 | Garabedian et al. | |
| 5,578,843 A | 11/1996 | Garabedian et al. | |
| 6,058,781 A * | 5/2000 | Kusuyama et al. | 73/724 |
| 6,211,558 B1 | 4/2001 | Ismail et al. | |
| 6,352,874 B1 | 3/2002 | McNeil et al. | |
| 2001/0047689 A1 * | 12/2001 | McIntosh | 73/514.32 |

\* cited by examiner

*Primary Examiner*—Edward Lefkowitz
*Assistant Examiner*—Andre Allen
(74) *Attorney, Agent, or Firm*—Jeffer, Mangels, Butler & Marmaro LLP (57) ABSTRACT

A pressure sensor system involves a semi-conductive diaphragm electrode overlying a cavity in a semiconductor chip, with the center of the diaphragm secured to a mesa extending upwardly from the cavity. A second electrode is implemented by a heavily doped raised ring between the mesa and the periphery of the chip at the ring of maximum deflection of the diaphragm. The raised ring electrode is heavily doped with one polarity, with light doping near the base of the raised area, and the remainder of the cavity is heavily doped with the opposite polarity. The plot of Linearity Error versus width of the ring electrode, has a minimum, and the width of the ring electrode and related constructional features are selected to conform to the minimum point of the linearity function. The reference capacitor is arcuate in configuration and extends part way around and in immediate proximity to the sensor diaphragm.

21 Claims, 8 Drawing Sheets

LINEARITY SEMI-CONDUCTIVE PRESSURE SENSOR

FIELD OF THE INVENTION

This invention relates to semi-conductive pressure sensors.

BACKGROUND OF THE INVENTION

It has previously been proposed to make pressure sensors of semiconductor material by so-called micromachining, involving oxidation, masking, etching and other known semiconductor processing steps; and U.S. Pat. No. 6,211,558 granted Apr. 3, 2001, and U.S. Pat. No. 6,352,874 disclose such techniques.

However, the pressure sensors of these references are not as linear as might be desired; and it would also be desirable to further reduce the size of the sensor systems.

In pressure sensor systems, the capacitance of a diaphragm type variable capacitance may be compared to a fixed reference capacitor and the resultant output provides an indication of the pressure applied to the diaphragm. U.S. Pat. No. 4,398,426 granted Aug. 16, 1983 discloses a system of this type.

SUMMARY OF THE INVENTION

In accordance with one illustrative embodiment of the present invention, linearity, reliability and stability are enhanced in a compact semi-conductive pressure sensor having a flexible diaphragm, by forming the assembly with a ring shaped raised electrode doped to provide a p-n junction at the base of ring shaped electrode. Further, the upper surface of the ring shaped electrode is preferably highly doped. In addition, the reference capacitor preferably has about the same capacitance as the variable diaphragm capacitor at maximum diaphragm deflection; and the reference capacitance is preferably arcuate shaped and extends closely around the diaphragm to minimize space on the semi-conductive chip while still having a capacitance comparable to that of the diaphragm capacitor. Also, with the reference capacitor and the variable capacitor being in immediate proximity, they are maintained at the same temperature, thus avoiding errors from temperature disparity.

In addition to forming the reference capacitor, and the cavity and raised electrode with which the diaphragm co-acts, the silicon chip may have transistors formed thereon for processing the variable capacitance of the diaphragm, and providing a linear voltage output with changes in pressure.

The linearity error of the diaphragm type pressure sensor may be calculated as a function of the effective width or area of the ring electrode, and this function has a minimum at the optimum effective width of the ring electrode. The pressure sensor is preferably constructed with the ring electrode having an effective width or area corresponding to this minimum.

The construction of the variable sensing capacitor may be accomplished by known Micro Electro-Mechanical Systems (or MEMS) technology, involving masking, etching and doping, with such individual steps being generally known in the art, as indicated in texts, and in the following patents: U.S. Pat. No. 6,211,448; U.S. Pat. No. 5,966,617; U.S. Pat. No. 5,578,843; and U.S. Pat. No. 5,576,251.

DETAILED DESCRIPTION OF PREFERRED EMBODIMENTS

While the specification describes particular embodiments of the present invention, those of ordinary skill can devise variations of the present invention without departing from the inventive concept.

The present detailed description will be divided into two parts, (1) a general description of the embodiments of the invention, and (2) a mathematical analysis.

Before going into the system in detail, however, some background information may usefully be provided. First, the dimensions of components of the invention may be relatively small, and may be referenced in terms of microns, sometimes using the symbol "μm" and being equal to $10^6$ meters. Where a centimeter is equal to about 0.39 inches, and a micron is 104 centimeters, each micron is $1/10,000$ of a centimeter. Reference is also made to nanometers, which may be abbreviated to nm, and which are equal to $10^{-9}$ meters. A nanometer is equal to one thousandth of a micron.

Regarding semiconductor materials, the principal semiconductors are germanium and silicon, with silicon being widely used. In its atomic structure, silicon has four electrons in its outer ring. As is well known, the elements arsenic and phosphorous are near silicon in the Periodic Table of elements, but have 5 electrons in their outer ring. When silicon is doped with these elements, four electrons are shared with adjacent silicon atoms, leaving the fifth electron for electrical conduction, forming an "n-type" semiconductor. Similarly, boron has only three electrons in its outer shall and the resultant missing electron is known as a "hole", forming "p-type" semi-conductive material in which electrical conduction is accomplished by mobile "holes" acting much like positive electrons.

The conductivity of silicon can be varied, by varying the concentration of the doping material or dopant, such as the arsenic or boron. As it happens, silicon has concentration of about $10^{23}$ or $10^{24}$ atoms per cubic centimeter. For strong doping or implantation (of boron or arsenic for examples) the concentration of the dopant would be about $10^{21}$ or $10^{22}$ atoms per cubic centimeter, giving a concentration of about 10% of the dopant. This strong or heavy doping by a p-type element such as boron may be referenced as p++ doping. Weaker doping levels, such as $10^{16}$ or $10^{17}$ atoms per cubic centimeter will be represented "p–" for example for p-type doping.

Figure 1:
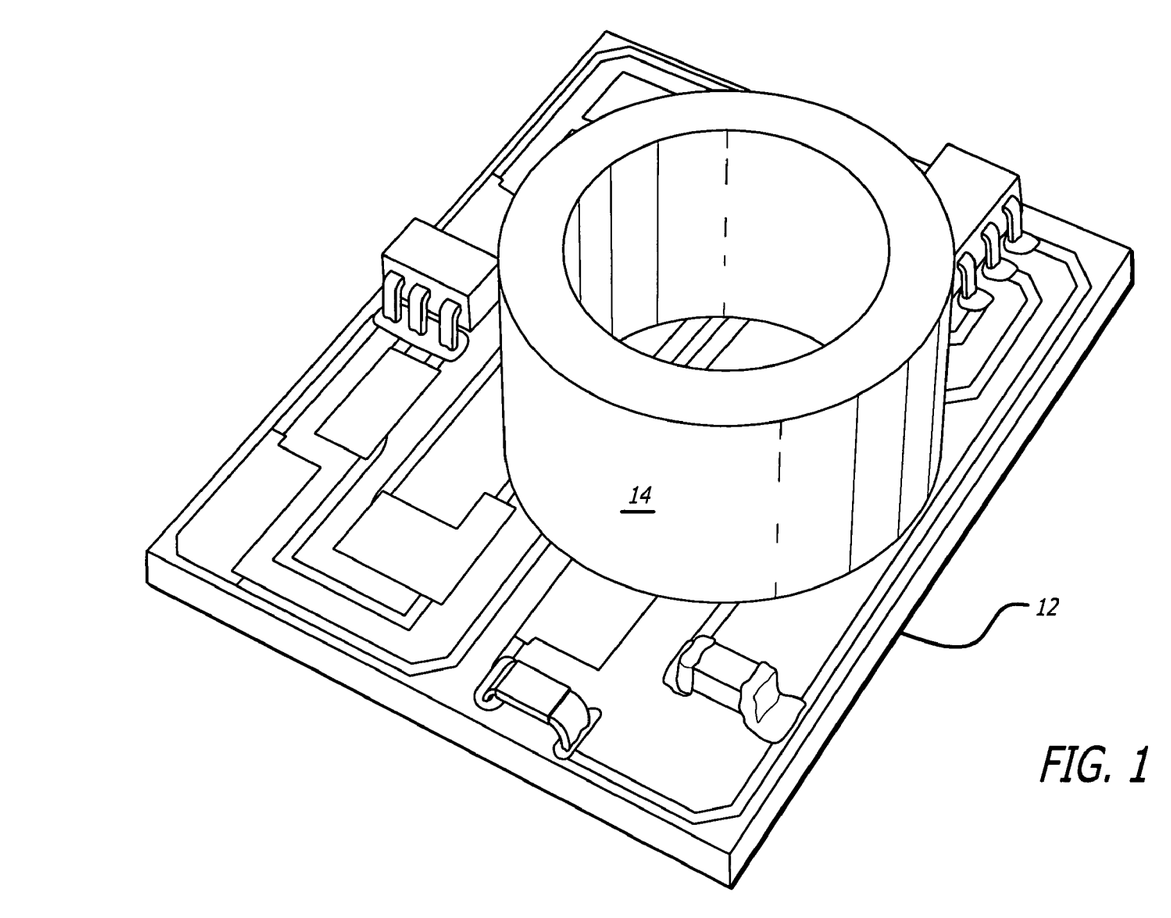
FIG. 1 is a perspective view of a pressure sensor system illustrating the principles of the invention.

Now, referring back to FIGS. 1 and 2 of the drawings, FIG. 1 is a perspective view and FIG. 2 is a top plan view of the pressure sensor system, with the ceramic chip 12 forming the substrate, and the tube 14 constituting an inlet for the pressure to be measured. Printed output circuitry is formed on the upper surface of chip 12.

Figure 2:
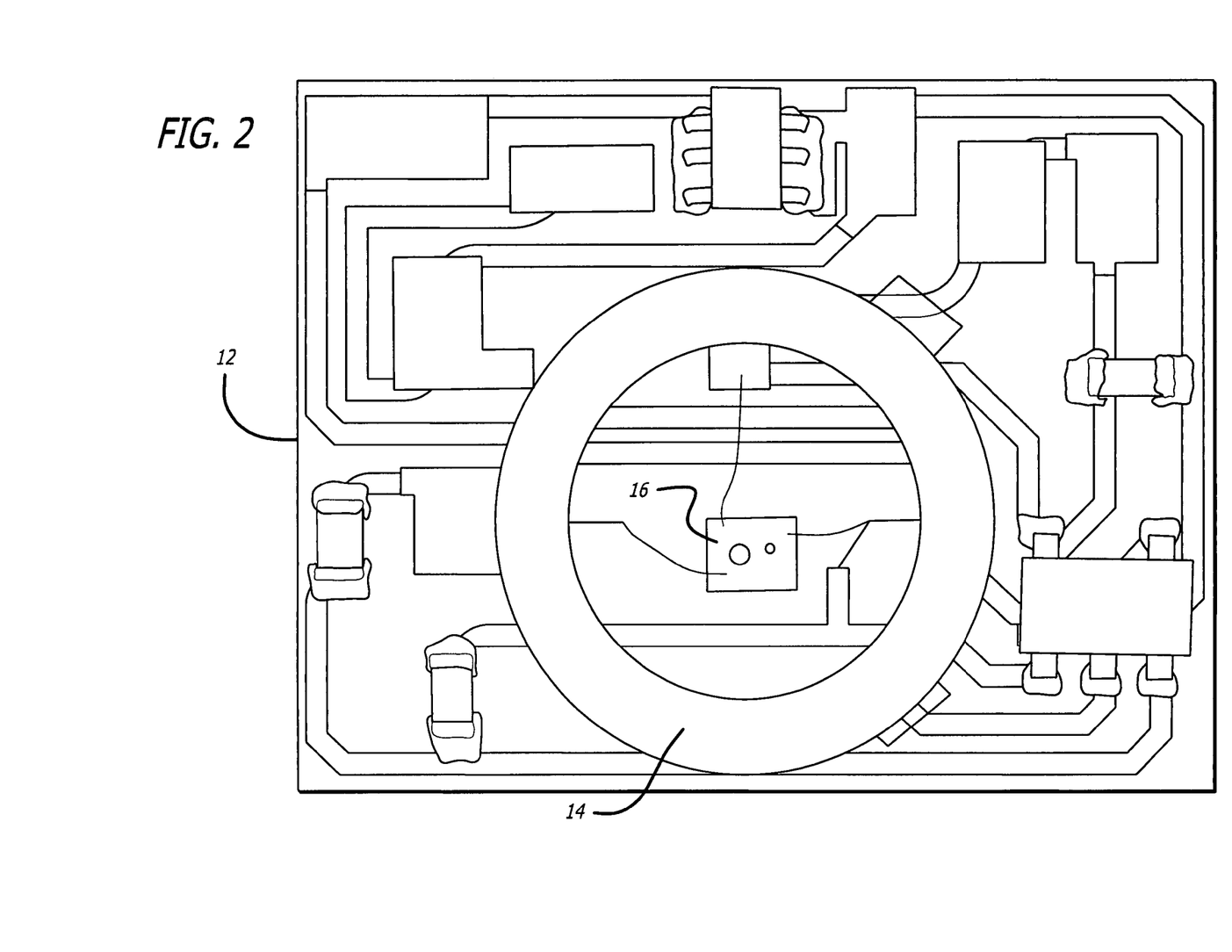
FIG. 2 is a plan view looking down on the pressure sensor system of FIG. 1, and showing a silicon die or chip mounted on the larger ceramic substrate.
Figure 3:
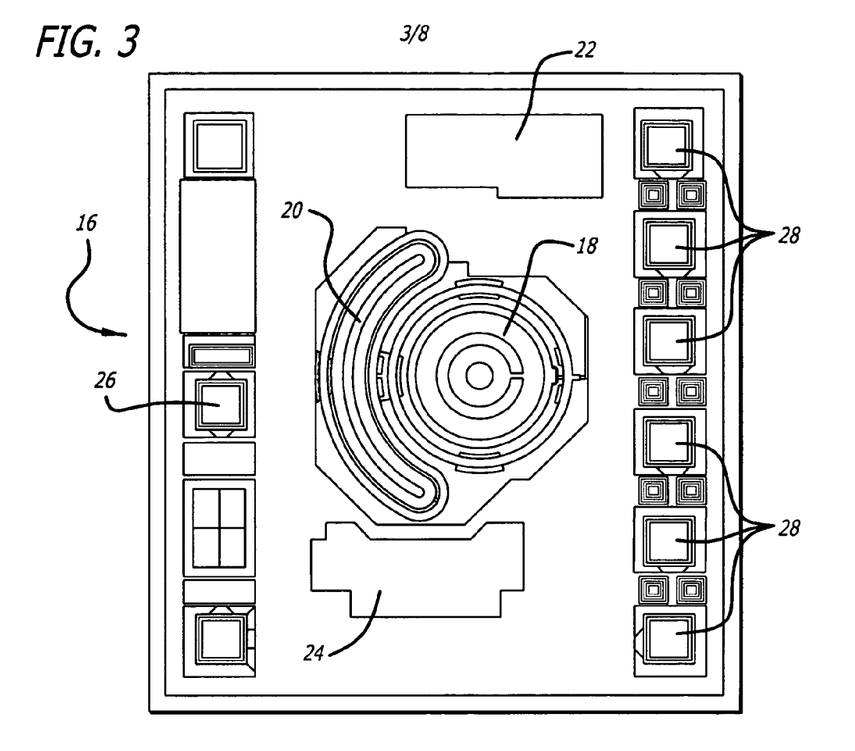
FIG. 3 is an enlarged plan view of the silicon chip which appears as a small rectangle in the showing of FIG. 2.

A silicon die 16 is visible in the plan view of FIG. 2, and an enlarged plan view of this silicon chip or die is presented in FIG. 3.

Incidentally, concerning dimensions, the ceramic chip 12 is about 1.1 cm by 1.6 cm; and the cylindrical pressure inlet 14 has a diameter of about 0.5 cm or 0.6 cm. the silicon chip or die is about two millimeters long and about 1.5 mm wide.

Now, referring back to FIG. 3 of the drawings, the silicon die includes the diaphragm 18 and the reference capacitor 20 which has an arcuate configuration and is in close proximity to the diaphragm 18. In addition, the reference capacitor and the variable capacitor at maximum deflection have approximately the same capacitance.

In the areas 22 and 24 of the silicon chip or die 16, integrated circuits are formed. These circuits convert the varying capacitance of diaphragm 18 into usable electrical signals indicating the applied pressure. Also shown in FIG. 3 are the output pad 26 and the output adjustment pads 28.

Figure 4:
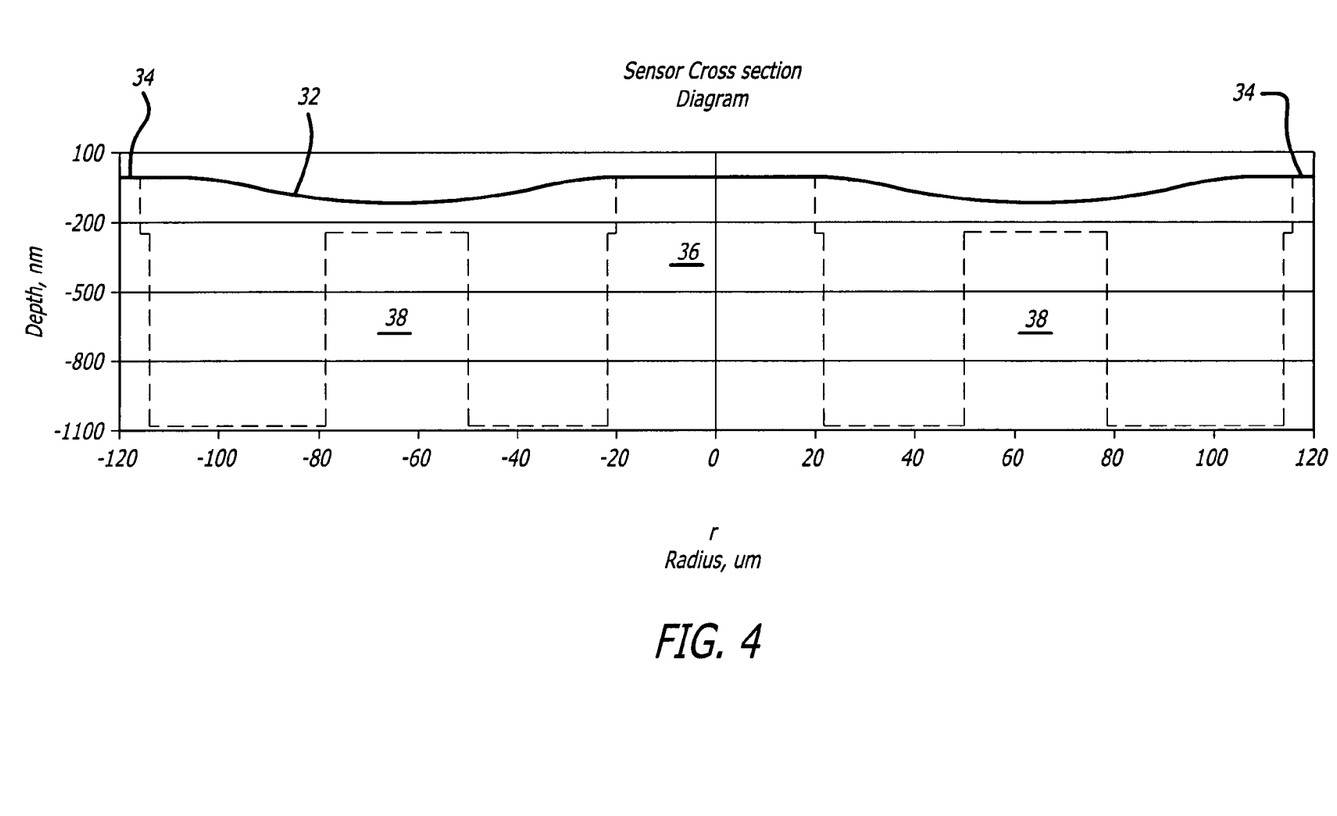
FIG. 4 is a schematic showing of the pressure sensor cross-section with the diaphragm in a partially deflected configuration.

FIG. 4 is a diagrammatic cross-sectional view of the circular diaphragm 32 mounted at its edges 34 to the surrounding silicon chip or die, and secured at its center to the central post 36. A ring shaped electrode 38 extends around the post 36. Note that this drawing is not to scale, and with the radius of the diaphragm being about 120 µm (microns or $10^{-6}$ meters) and the depth being only 1100 nm (nanometers or $10^{-9}$ meters), or 1.1 microns. Accordingly, the cavity is quite shallow, with the maximum depth being only 1.1 microns, as compared with a radius of 120 microns.

Figure 5:
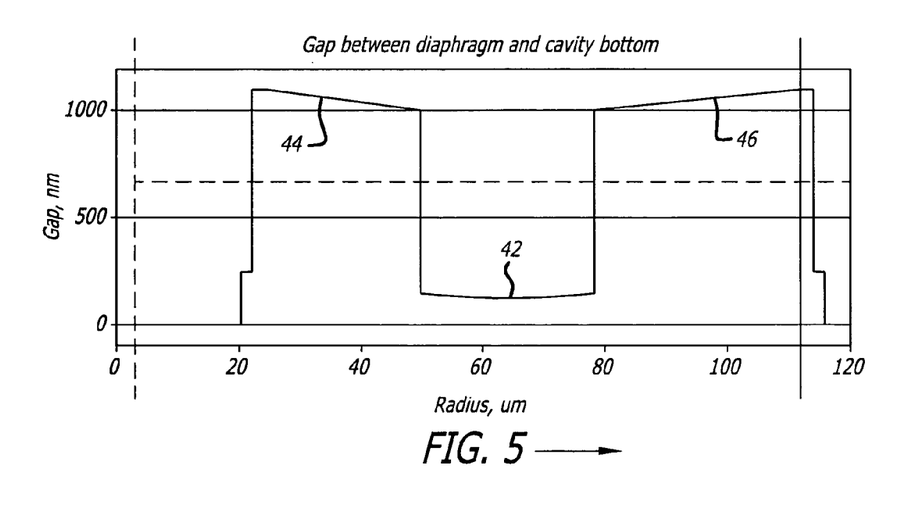
FIG. 5 is a plot of the gap between the diaphragm and the underlying cavity with the raised ring shaped electrode.

FIG. 5 is a plot of the gap between the diaphragm and the cavity bottom plotted against the radius of the cavity, at maximum diaphragm deflection. Note that FIG. 5 shows the plot against the radius, while FIG. 4 is a schematic showing of the full diameter of the diaphragm and associated cavity. In FIG. 5, note that the gap in area 42, in the vicinity of the ring shaped electrode 38, is relatively small, while the gap 44 near the center of the diaphragm is quite large, as is the gap 46 between the ring electrode 36 and the periphery 34 of the diaphragm. Accordingly, with capacitance being inversely proportional to the space between electrodes, the raised ring shaped electrode contributes in a major way to the sensor capacitance.

Figure 6A:
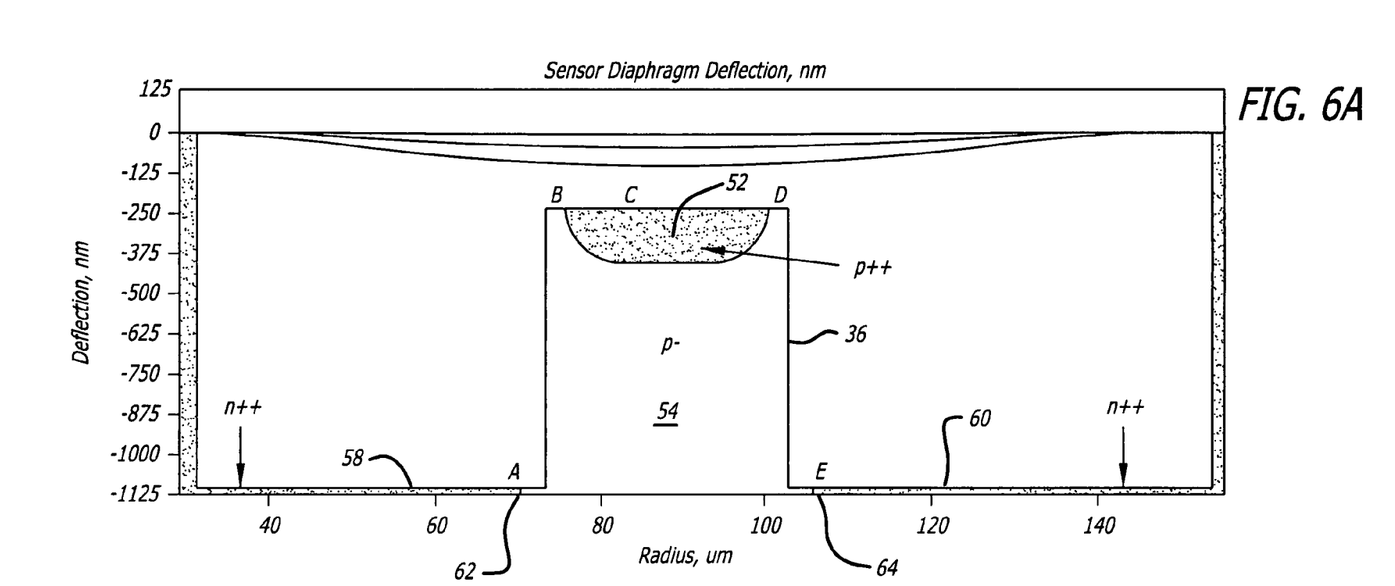
FIG. 6A is a schematic showing of the doping of the ring shaped electrode and the cavity of the pressure sensor.

FIG. 6A shows the preferred doping of the ring electrode and the adjacent cavity, with FIG. 6A again being a radial showing, with the center of the diaphragm to the left of FIG. 6A. Note that the upper surface of the ring electrode 36 is heavily doped with boron, forming a p++ zone, and the lower portion 54 of the ring electrode 36 is only weakly doped, as indicated by the "p–" designation. The remainder of the cavity, including the inner area 58 and the outer area 60, are doped strongly with an n-type dopant such as arsenic or phosphorous, from column V-A of the Periodic Table. These areas are labeled "n++" to indicate heavy doping. Note that there are p-n junctions 62 and 64 at the base of the ring shaped electrode 36.

Figure 6B:
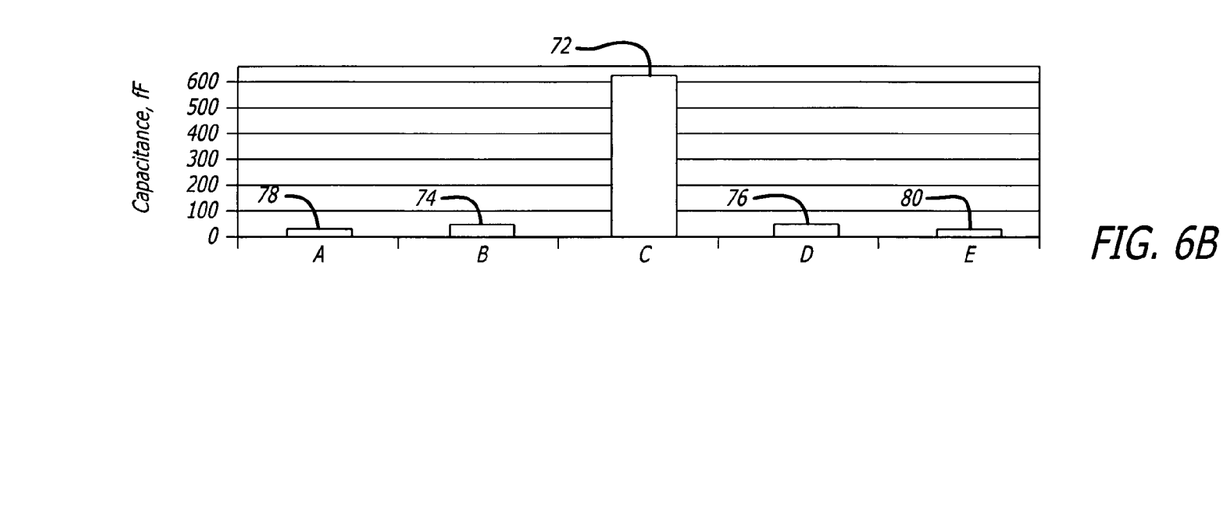
FIG. 6B is a plot of the capacitance contributions of the upper surface of the doped ring shaped electrode and areas of the associated cavity.

FIG. 6B indicates the contributions to total capacitance from the areas within the cavity. Reference numeral 72 designates the principal contribution to capacitance from the p++ area on the facing surface of ring electrode 36; reference numerals 74 and 76 designate the capacitance contributions from areas on the sides of the ring electrode; and reference numerals 78 and 80 refer to capacitance contributions from areas of the cavity immediately adjacent the ring electrode 36. The arrows from FIG. 6B to FIG. 6A indicate the designated areas contributing to the total capacitance. In FIG. 6B the capacitance is indicated in terms of "fF" or "Fremto-Farads" or $10^{-15}$ farads, with a farad being the basic unit for the measurement of capacitance.

Figure 7:
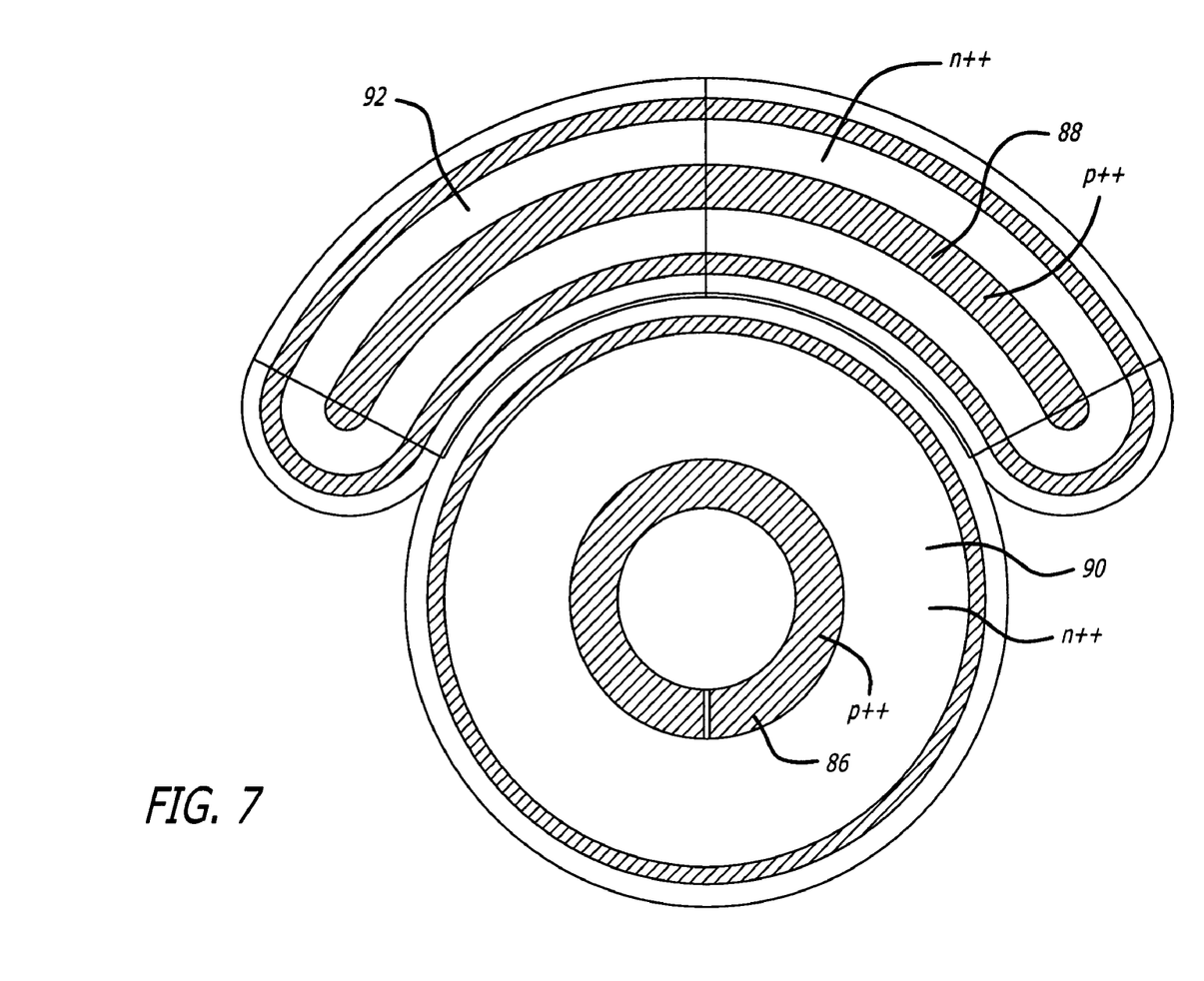
FIG. 7 is a showing of the implant or doping distribution of the bottom electrode surface.

FIG. 7 is a schematic showing of the dopant implant distribution on the bottom electrode surface of both the electrode and cavity facing the diaphragm, and the reference electrode, which is formed concurrently. The p++ area 86 on the upper surface of the ring electrode is particularly to be noted, along with the comparable p++ area 88 on the reference electrode. The heavily doped n++ areas 90 and 92 on the ring electrode and the reference capacitor electrode, are also to be noted.

Figure 8:
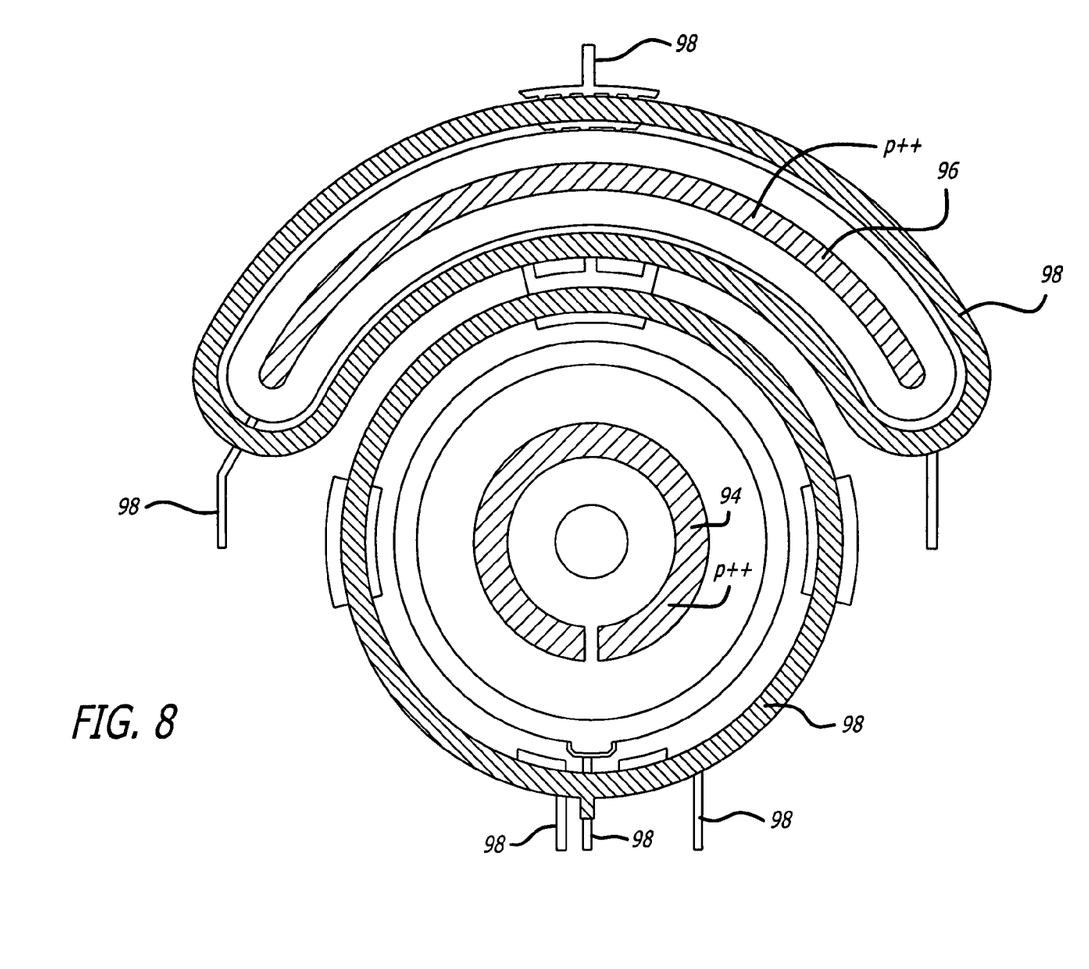
FIG. 8 is an enlarged plan view of the diaphragm which deflects and changes capacitance with variable applied pressure, and the adjacent arcurate reference capacitor.

FIG. 8 is a diagrammatic showing of the doping of the diaphragm of the variable capacitor, and of the upper electrode of the reference capacitor. In FIG. 8, the p++ area 94 overlies the ring electrode area 86 of FIG. 7, and the p++ area 96 of the upper electrode of the reference capacitor overlies the similarly doped area 88 of the lower electrode of the reference capacitor.

As noted elsewhere in this specification, the capacitance of the reference electrode is preferably about the same as the maximum capacitance of the sensor capacitor. The upper and lower electrode of the reference capacitor may be spaced apart by dielectric material, or may be configured as a diaphragm but limited in deflection so that the reference capacitance is not substantially changed with varying pressure.

In FIG. 8 the metallic electrical connections are shown schematically for connecting the variable and reference capacitors to the associated circuitry.

With regard to the shape of the reference capacitor as shown in FIGS. 3, 7 and 8, it is preferably arcuate and extends around the diaphragm for less than 270° and preferably less than 180°; and is preferably immediately adjacent the diaphragm. Space on the silicon chip, as shown in FIG. 3, is at a premium, and this configuration minimizes the space occupied by the reference capacitor consistent with the size of the reference capacitor being of the same order of magnitude and preferably about equal to that of the diaphragm capacitor.

Figure 9:
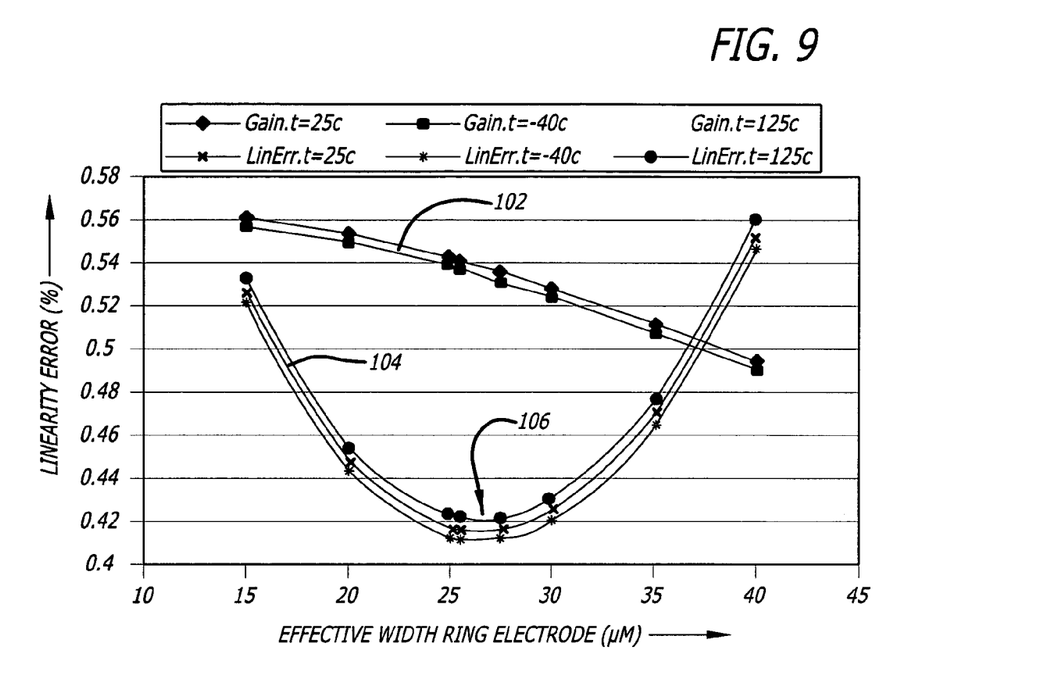
FIG. 9 is a graph of (1) linearity error and (2) "gain" plotted against effective width of the ring shaped electrode.

FIG. 9 is a function of sensor "gain" 102 and linearity error 104, plotted against effective width of the ring electrode. It may be noted that, with a predetermined effective width of the ring electrode, the linearity error reaches a minimum 106 where the departure from linearity is about 0.42%, or less than one-half of one percent.

Figure 10:
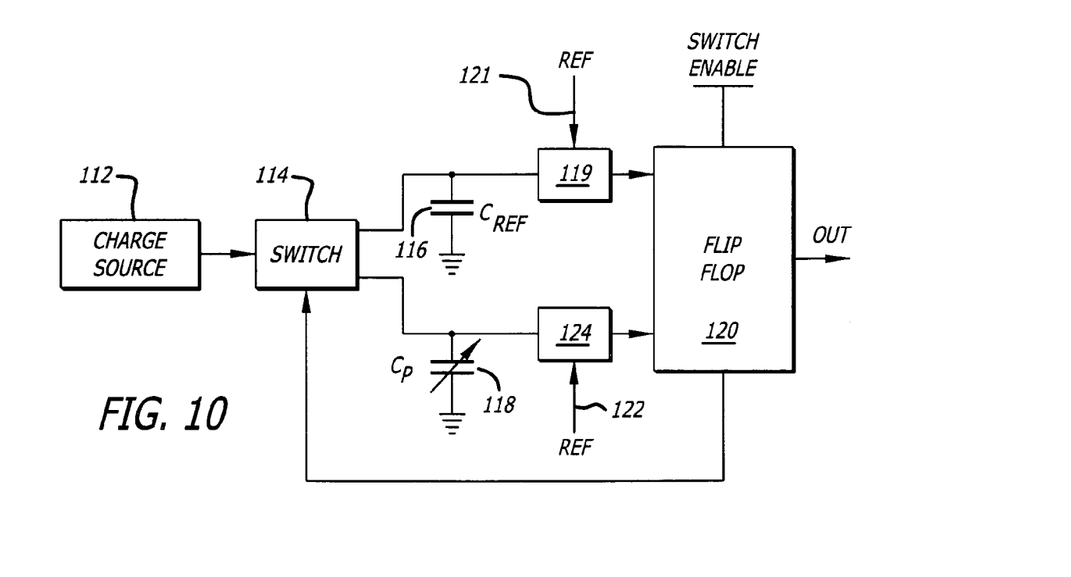
FIG. 10 is a schematic block diagram indicating how the capacitance variations of the diaphragm may be converted into electrical signals.

FIG. 10 shows one typical circuit for converting the capacitance variations of the diaphragm capacitor to electrical signals representing the input pressure. In FIG. 10 current from the source 112 is routed by the switching circuit 114 to either the reference capacitor 116 or to the variable capacitor 118. During one part of the cycle, a charging current is applied to reference capacitor 116. When the voltage on reference capacitor 116 reaches a predetermined reference voltage level, see 121, the comparator circuit 119 provides an output signal to bistable circuit 120 which provides both an output signal, and also switches the input charging source 112 to apply current to the variable capacitor 118. When variable capacitor 118 is charged to a reference level determined by an input reference signal at 122, the comparator 124 provides an output signal to bitable Circuit 120. Circuit 120 provides an output signal and also actuates switching circuit 114 to direct the charging current to reference capacitor 116. Accordingly, the output from bistable circuit 120 is a function of the capacitance of the variable capacitor 118, and thus is an indication of the pressure applied to the diaphragm. It is noted that the circuit of FIG. 10 is well known, and is one of many circuits which can be employed. Further, circuitry such as that shown in FIG. 10 may be implemented by the integrated circuits on areas 22 or 24 of FIG. 3.

In the foregoing initial section of the specification, the drawings and preferred embodiments have been described. In the following section, the associated mathematical analysis will be presented. This mathematical analysis is against the background of the sensor as described hereinabove with the capacitance of the reference capacitor being $C_r$ and the variable capacitance of the sensing diaphragm capacitor being designated $C_s$.

Initially, the transfer function of the pressure sensor is a several variable function, $V_{out}=f(\xi, \alpha, \beta, \gamma)$, where $\xi=C_r/C_s$ is the capacitance ratio of reference capacitor, $C_r$, to variable sensor capacitor, $C_s$. We assume that the value of sensor capacitor, $C_s$, capacitor changes due to applied pressure, p while variation of the reference capacitor is small. The other variables are on-chip parameters: the parameter used for offset adjustment is denoted by $\alpha$, the gain adjustment parameter is denoted by $\beta$, and the linearity adjustment parameter is denoted below either by LIN or by $\lambda$. The sensor transfer function is approximated by the equation $$V_{out} = V_{dd} \cdot \frac{(1-\alpha \cdot \xi)}{\beta \cdot (1-\lambda \cdot \xi)} \qquad \text{Eq. (1)}$$

Where $V_{out}$ is sensor output, $V_{dd}$ is supply voltage.

Consider sensor parameters that directly effect linearity of a rationmetric sensor output. By definition, sensor output shows zero nonlinearity error if the sensor transfer function can be approximated by a linear function of pressure. However, in the reality, sensor transfer function (Eq. (1)) always deviates from the ideal output. Difference between linear output and sensor transfer function is called approximation error. The integrated level of approximation error is conventionally estimated by L2-norm value (see "Mathematical Handbook for Scientists and Engineers" by G. A. Korn, T. M. Korn). By definition, the norm is calculated as a dot product of approximation error $N_{L2} \equiv \|\delta V_{Out}\|_{L2} = (\delta V_{Out}, \delta V_{Out})^{1/2}$, where $\delta V_{Out}$ denotes sensor output approximation error over full pressure range, and $(\ldots, \ldots)$ is function dot product $$(\delta V_{Out}, \delta V_{Out}) = (p_{max} - p_{min})^{-1} \cdot \int_{p_{min}}^{p_{max}} \delta V_{Out}(\zeta) \cdot \delta V_{Out}(\zeta) d\zeta.$$

We define approximation error of a sensor transfer function (Eq. 1) as deviation of sensor output from ideal linear output signal $$\delta V_{out} = V_{out}|_{p_{min}} \cdot B_0(p) + V_{out}|_{p_{max}} \cdot B_1(p) - V_{out}(p) \qquad \text{Eq. (2)}$$

where $V_{out}(p)$ is sensor output transfer function and $B_0$, $B_1$ are first order B-splines $$B_0(p) = \frac{p_{max}-p}{p_{max}-p_{min}} \text{ and } B_1(p) = \frac{p-p_{min}}{p_{max}-p_{min}}.$$

In order to generalize analysis results we exclude $\beta$ parameter from the analysis. Hence, sensor output (Eq. 1) is written in dimensionless form $$\hat{V}_{Out} \equiv \frac{V_{out} \cdot \beta}{V_{dd}} = \frac{(1-\alpha \cdot \xi)}{(1-\lambda \cdot \xi)} \qquad \text{Eq. (3)}$$

In addition, in order to simplify calculations, parameter $\alpha$ also can be eliminated from the analysis. In order to do so we use constrain $\hat{V}_{out_{p_{min}}}=0$, which yields $\alpha=1/\xi|_{p_{min}}$. Here and below we consider a case in which $$\frac{\partial C_r}{\partial p} \ll \frac{\partial C_s}{\partial p} \text{ and } \xi|_{p_{min}} > \xi|_{p_{max}}.$$

As a result, sensor transfer function becomes $$\overline{V}_{Out} \equiv \frac{V_{out} \cdot \beta}{V_{dd}} = \frac{(\xi|_{p_{min}} - \xi|_p)}{(1-\lambda \cdot \xi|_p) \cdot \xi|_{p_{min}}} \qquad \text{Eq. (4)}$$

where $\xi|_p = C_r/C_s$ is a function of pressure. Capacitance ratio $\xi$ can be approximated by a second order polynomial function of pressure $$\xi|_p = \xi|_{p_{min}} \cdot B_0(p) + \xi|_{p_{max}} \cdot B_1(p) + [4 \cdot \xi|_{p_x} - 2 \cdot (\xi|_{p_{min}} + \xi|_{p_{max}})] \cdot B_0(p) \cdot B_1(p) \qquad \text{Eq. 5}$$

where $p_x=0.5 \cdot (p_{max}+p_{min})$ is median of full pressure range. It is known from mathematics that any second order polynomial approximation can be entirely characterized by a set of three independent parameters. Hence, we use below a parameter set which includes three independent paramenters. The first parameter is the value of $\xi|_{p_{max}}$. The second parameter is capacitance ratio gain, g, and the third parameter is capacitance ratio nonlinearity error, $n_\xi$.

The other variables needed for the analysis can be calculated by using above parameter set. For example, by the definition, capacitance ratio gain is calculated by the equation $g=(\xi|_{p_{min}}-\xi|_{p_{max}})/\xi|_{p_{max}}$, which yields $$\xi|_{p_{min}} = (1+g) \cdot \xi|_{p_{max}}. \qquad \text{Eq. (6)}$$

By the definition, capacitance ratio nonlinearity error, $n_\xi$, is calculated by the equation $$n_\xi = \frac{(\xi|_{p_{\max}} + \xi|_{p_{\min}}) - 2 \cdot \xi|_{p_x}}{2 \cdot (\xi|_{p_{\max}} - \xi|_{p_{\min}})}, \quad \text{Eq. (7)}$$

which yields, $\xi|_{p_x} = \xi|_{p_{max}} \cdot (0.5 - n_\xi) + \xi|_{p_{min}} (0.5 + n_\xi)$. As a result, the value of $\xi|_{P_x}$ is calculated by equation $$\xi|_{p_x} = (1 + g \cdot (0.5 + n_\xi)) \cdot \xi|_{p_{max}} \quad \text{Eq. (8)}$$

If we substitute the Eq. (6–8) into the Eq. (5), we get $$\xi|_p = [(1+g) \cdot B_0(p) + B_1(p) + 4 \cdot g \cdot n_\xi \cdot B_0(p) \cdot B_1(p)] \cdot \xi|_{p_{max}} \quad \text{Eq. (9)}$$

If we substitute the Eq. (9) into the Eq. (2, 4) we can calculate the value of norm-$L_2$, $N_{L2} \|\delta \vec{V}_{Out}\|_{L2} = (\delta \vec{V}_{Out}, \delta \vec{V}Out)^{1/2}$, as a function of nonlinearity error and capacitance ratio gain.

By definition, full span nonlinearity error of sensor output, $n_{out}$, is calculated by the equation $$n_{out} = \frac{0.5 \cdot (V_{out}|_{p_{\max}} + V_{out}|_{p_{\min}}) - V_{out}|_{p_x}}{V_{out}|_{p_{\min}} - V_{out}|_{p_{\min}}} \quad \text{Eq. (10)}$$

where $p_x = 0.5 \cdot (p_{max} + p_{min})$ is the median of full pressure range. Upon substitution of the Eq. (1) into the Eq. (10) yields $$n_{out} = \frac{0.5 \cdot [\xi|_{p_{\max}} \cdot (1 - \lambda \cdot \xi|_{p_{\max}})^{-1} + \xi|_{p_{\min}} \cdot (1 - \lambda \cdot \xi|_{p_{\min}})^{-1}] - \xi|_{p_x} \cdot (1 - \lambda \cdot \xi|_{p_x})^{-1}}{\xi|_{p_{\max}} \cdot (1 - \lambda \cdot \xi|_{p_{\max}})^{-1} - (\xi|_{p_{\min}} \cdot (1 - \lambda \cdot \xi|_{p_{\min}})^{-1})} \quad \text{Eq.(11)}$$

where $\xi|_{p_x} = \xi|_{p_{max}} \cdot (0.5 - n_\xi) + \xi|_{p_{min}} \cdot (0.5 + n_\xi)$.

The value of linearity adjustment parameter, $\lambda_0$ is solution of the equation $n_{out}(\lambda_0) = 0$, which yields $$\lambda_0 = \frac{(\xi|_{p_{\max}} + \xi|_{p_{\min}}) - 2 \cdot \xi|_{p_x}}{\xi|_{p_{\max}} \cdot (\xi|_{p_{\min}} - \xi|_{p_x}) + \xi|_{p_{\min}} \cdot (\xi|_{p_{\max}} - \xi|_{p_x})} \quad \text{Eq.(12)}$$

The Eq. (12) can be reduced to the form $$\lambda_0 = \frac{4 \cdot n_\xi}{(4 \cdot n_\xi + g \cdot (1 + 2 \cdot n_\xi)) \cdot \xi|_{p_{\max}}}.$$

Constrain $\lambda_0 \cdot \xi|_{p_{max}} < (1+g)^{-1}$ yields a few additional limits to the above parameters—Eq. (12) can be used for $\lambda_0$ calculations only if $g > 0$ and $-g/(4 + 2 \cdot g) < n_\xi < 0.5$.

Another important restriction of the design parameters is a requirement of small value for parameter $\lambda \ll 1$. Indeed, in order to show good performance sensor we must have relatively large output signal gain. However, if $\lambda$ increases sensor output gain must decrease.

We can prove the foregoing by considering the equation for die output gain:

$$g_v \equiv \frac{dV_{out}}{V_{out}} = d(\ln(V_{out})) \quad \text{Eq.(13)}$$

Upon substitution of the Eq. (1, 3) into Eq. (13) yield $$g_v = \left[ \frac{\lambda \cdot \xi}{(1 - \lambda \cdot \xi)} - \frac{\alpha \cdot \xi}{(1 - \alpha \cdot \xi)} \right] \cdot g_\xi \quad \text{Eq.(14)}$$

where $$g_\xi = \frac{d\xi}{\xi} = \frac{dC_r}{C_r} - \frac{dC_s}{C_s}.$$

After some simple algebra the Eq. (14) becomes $$\frac{g_v}{(g_s - g_r)} = \frac{(\alpha - \lambda)}{(1 - \lambda \cdot \xi) \cdot (1 - \alpha \cdot \xi)} \quad \text{Eq.(15)}$$

where $$g_s = \frac{dC_s}{C_s} \text{ and } g_r = \frac{dC_r}{C_r}$$

are respectively sensor and reference capacitor gain, and $g_r \ll g_s$. If $\alpha > \lambda \geq 0$, maximal value of $g_v/(g_s - g_r)$ ratio corresponds to $\lambda = 0$ and the value of sensor output gain $g_v$ always decreases if the value of the parameter $\lambda$ increases.

We will now consider a minimization procedure of capacitance ratio nonlinearity error, $n_\xi$ for a MEMS capacitor design consists of flexible diaphragm covering sensor cavity with a doped pattern located on the cavity bottom. If the flexible diaphragm deflects down due to external pressure, the gap between the diaphragm surface and the cavity bottom decreases proportionally to diaphragm deflection. For such a case, capacitance is calculated by the equation.

$$C_\zeta(p) = \int_{A_\zeta} \Theta(x, y) \cdot \left( C_{p+}^{-1} + C_{n+}^{-1} + \frac{d(x, y) - w_\zeta(p, x, y)}{\varepsilon_o} \right)^{-1} dxdy \quad \text{Eq.(16)}$$

$$\zeta = \{s, r\}$$

where $A_{\zeta \in R}^2$ is MEMS capacitor area, $d(x,y)$ is a function describing cavity depth variation, $C_{p+}$ and $C_{n+}$ is respectively surface capacitances of diaphragm surface and boron doped pattern, $\epsilon_o$ is dielectric permittivity of free space, and $$\Theta(x, y) = \begin{cases} 1 & (x, y) \in \Omega_{p++} \\ 0 & (x, y) \notin \Omega_{p++} \end{cases} \Omega_{p++} \subset R^2 \quad \text{Eq.(17)}$$

is step function that defines boron doped region, $\Omega_{p++}$, on the bottom of MEMS cavity. Diaphragm deflection w=w(p, x, y) is a function of pressure, p, and coordinates x and y. According to the theory of elasticity the function w=w(p, x, y) must be a linear function of pressure. To simplify notation the Eq. (17) is written in the form $$C_\zeta(p) = \frac{\varepsilon_o}{d_*} \int_{A_\zeta} \Theta(x, y) \cdot (1 - \Psi(p, x, y))^{-1} dx dy; \zeta = \{s, r\} \quad \text{Eq.(18)}$$

where $$d_* = (C_{p+}^{-1} + C_{n+}^{-1})\varepsilon_o + d_o, d_o$$

is a constant, and $$\Psi_\zeta(p, x, y) \equiv \frac{w_\zeta(p, x, y) + d_0 - d(x, y)}{d_*}$$

is a linear function of pressure. In the polar coordinate system the Eq. (18) becomes $$C_\zeta(p) = \left(\frac{\varepsilon_0}{d_*}\right) \cdot \int_{A_\zeta \cap \Omega_{p++}} (1 - \Psi_\zeta(p, r))^{-1} r dr d\varphi; \zeta = \{s, r\}$$

where $$A_\zeta \cap \Omega_{p++} = \{(r, \varphi) \in R^2; r \in [R_{min}^{(\zeta)}, R_{max}^{(\zeta)}]; \varphi \in [0, 2\pi]\}$$

and $r = ((x-x_0)^2+(y-y_0)^2)^{1/2}$ is radial coordinate of a polar coordinate system with origin in the point $(x_0, y_0)$. The result of this analysis is shown graphically in FIG. 9 of the drawings.

CONCLUSION

In the foregoing detailed description and mathematical analysis, one specific preferred embodiment has been disclosed and analyzed. Various changes and modifications may be made without departing from the spirit and scope of the invention. Thus, by way of example and not of limitation, the arcuate reference capacitor configuration, located adjacent the diaphragm may be used with diaphragms not having a central fixed post, or having other shapes. Also, the n-type and p-type semi-conductive areas may be interchanged. The second electrode is preferably raised, but could be in the form of a heavily doped area on a flat cavity bottom. The second ring electrode is also preferably located along the line of maximum deflection of the diaphragm. The minimization of non-linearity may be implemented with other diaphragm geometries. Novelty is present in some cases relative to individual features of the invention, and is not limited to the complete combination as referenced in the illustrative embodiment of the invention included in the Summary of the Invention. In some cases, for example, the center of the diaphragm may not be secured to a raised mesa from the cavity. Accordingly, the present invention is not limited to the specific embodiment shown in the drawings and mathematically analyzed.

We claim:

1. A pressure sensor system comprising:
   a semiconductor chip;
   a diaphragm constituting a first electrode, formed on said chip; said diaphragm being formed of semi-conductive material; said diaphragm facing a cavity in said chip with a second electrode in the form of a doped semiconductor raised area facing said diaphragm; said first and second electrodes constituting a sensing capacitor with a capacitance that varies with deflection of said diaphragm;
   a reference capacitor formed on the surface of said chip in an arcuate configuration adjacent said diaphragm, said reference capacitor having a capacitance in the same order of magnitude as said sensing capacitor;
   said cavity having a raised mesa secured to the center of said diaphragm;
   said second electrode being substantially in the form of a raised ring extending around said mesa, and with said raised ring located between said mesa and the periphery of the diaphragm;
   said semiconductor chip having a p-n junction substantially at the base of the raised ring forming the second electrode;
   circuitry formed on said chip for converting capacitance variations of said diaphragm relative to said reference capacitor, to a substantially linear output with changes in pressure applied to said diaphragm; and
   bonding pads mounted on said chip to receive leads for coupling to external circuitry.

2. A pressure sensor system as defined in claim 1 wherein said capacitance of said reference capacitor is substantially equal to that of the variable sensing capacitor.

3. A pressure sensor system as defined in claim 1 wherein the dimensions of said raised ring and the doping thereof are selected to conform to the minimum of the function of output signal linearity error versus the width of the ring electrode.

4. A pressure sensor system as defined in claim 1 wherein the ring shaped electrode is heavily doped with one semiconductive polarity at the surface thereof facing the diaphragm, and has lesser doping concentration toward the base of the ring, and the remainder of the cavity is doped with the opposite semi-conductive polarity.

5. A pressure sensor system as defined in claim 1 wherein said reference capacitor extends around said diaphragm for substantially equal to or less than half way around said diaphragm.

6. A pressure sensor system comprising:
   a semiconductor chip;
   a diaphragm formed on said chip; said diaphragm constituting a first electrode formed of semi-conductive material; said diaphragm facing a cavity in said chip with a second electrode in the form of a doped semiconductor raised area facing said diaphragm; said first and second electrodes constituting a sensing capacitor with a capacitance that varies with deflection of said diaphragm;

a reference capacitor formed on the surface of said chip in an arcuate configuration adjacent said diaphragm;

circuitry formed on said chip for converting capacitance variations of said diaphragm relative to said reference capacitor, to a substantially linear output with changes in pressure applied to said diaphragm; and bonding pads also mounted on said chip to receive leads for coupling to external circuitry.

7. A pressure sensor system as defined in claim 6 wherein said capacitance of said reference capacitor is substantially equal to that of the variable sensing capacitor.

8. A pressure sensor system as defined in claim 6 wherein the dimensions of said second electrode and the doping thereof provide a capacitance selected to minimize the linearity error in output voltage versus pressure applied to deflect said diaphragm.

9. A pressure sensor system as defined in claim 5 wherein the second electrode is heavily doped with one semi-conductive polarity at the surface thereof facing the diaphragm, and has a lesser doping concentration of the same polarity toward the base of the second electrode, and the remainder of the cavity is doped with the opposite semi-conductive polarity.

10. A pressure sensor system comprising:
a semiconductor chip;
a diaphragm constituting a first electrode, formed on said chip; said diaphragm being formed of semi-conductive material; said diaphragm facing a cavity in said chip with a second electrode in the form of a doped semi-conductor raised area facing said diaphragm; said first and second electrodes constituting a sensing capacitor with a capacitance that varies with deflection of said diaphragm; and a reference capacitor formed on the surface of said chip in an arcuate configuration adjacent said diaphragm, said reference capacitor having a capacitance in the same order of magnitude as said sensing capacitor.

11. A pressure sensor system as defined in claim 10 wherein said capacitance of said reference capacitor is substantially equal to that of the variable sensing capacitor.

12. A pressure sensor system as defined in claim 10 wherein the dimensions of said raised ring and the doping thereof are selected to conform to the minimum of the function of output signal linearity error versus the width of the ring electrode.

13. A pressure sensor system as defined in claim 10 wherein said reference capacitor extends around said diaphragm for substantially equal to or less than half way around said diaphragm.

14. A pressure sensor system comprising:
a semiconductor chip;
a diaphragm formed on said chip; said diaphragm constituting a first electrode formed of semi-conductive material; said diaphragm facing a cavity in said chip with a second electrode in the form of a doped semi-conductor raised area facing said diaphragm;
said first and second electrodes constituting a sensing capacitor with a capacitance that varies with deflection of said diaphragm;
a reference capacitor formed on the surface of said chip in an arcuate configuration adjacent said diaphragm; and
the second electrode being heavily doped with one semi-conductive polarity at the surface thereof facing the diaphragm, and having lesser doping concentration toward the base of the second electrode and the remainder of the cavity being doped with the opposite semi-conductive polarity.

15. A pressure sensor system as defined in claim 14 wherein said capacitance of said reference capacitor is substantially equal to that of the variable sensing capacitor.

16. A pressure sensor system as defined in claim 14 wherein the dimensions of said raised ring and the doping thereof are selected to conform to the minimum of the function of output signal linearity error versus the width of the ring electrode.

17. A pressure sensor system as defined in claim 14 further comprising a raised mesa secured to the center of said diaphragm.

18. A pressure sensitive system as defined in claim 14 wherein the second electrode is in the form of a ring.

19. A pressure sensor system comprising:
a semiconductor chip;
a diaphragm constituting a first electrode, formed on said chip; said diaphragm being formed of semi-conductive material; said diaphragm facing a cavity in said chip with a second electrode in the form of a doped semi-conductor area facing said diaphragm; said first and second electrodes constituting a sensing capacitor with a capacitance that varies with deflection of said diaphragm;
a reference capacitor formed on the surface of said chip;
said cavity having a raised mesa secured to the center of said diaphragm;
said second electrode being substantially in the form of a ring extending around said mesa, and with said electrode being located between said mesa and the periphery of the diaphragm; and
said electrode being heavily doped with one semi-conductive polarity, and the remainder of said cavity being doped with the opposite semi-conductive polarity.

20. A pressure sensor system as defined in claim 19 wherein the dimensions of said second electrode and the doping thereof are selected to conform to the minimum of the function of the output signal linearity error versus the width of the second electrode.

21. A pressure sensor system comprising:
a semiconductor chip;
a diaphragm constituting a first electrode, formed on said chip; said diaphragm being formed of semi-conductive material; said diaphragm facing a cavity in said chip with a second electrode in the form of a doped semi-conductor area facing said diaphragm; said first and second electrodes constituting a sensing capacitor with a capacitance that varies with deflection of said diaphragm;
a reference capacitor formed on the surface of said chip;
said second electrode being heavily doped with one semi-conductive polarity, and the remainder of said cavity being doped with the opposite semi-conductive polarity; and
the dimensions of said second electrode and the doping thereof are selected to conform to the minimum of the function of the output signal linearity error versus the area of the second electrode.

* * * * *